March 17, 1970 R. M. BERLER 3,501,644
RADIATION SENSITIVE BOWLING PIN SENSOR

Filed May 31, 1967 2 Sheets-Sheet 1

INVENTOR
ROBERT M. BERLER
BY
*Eli Weiss*
ATTORNEY

March 17, 1970 R. M. BERLER 3,501,644
RADIATION SENSITIVE BOWLING PIN SENSOR
Filed May 31, 1967 2 Sheets-Sheet 2
FIG. 2
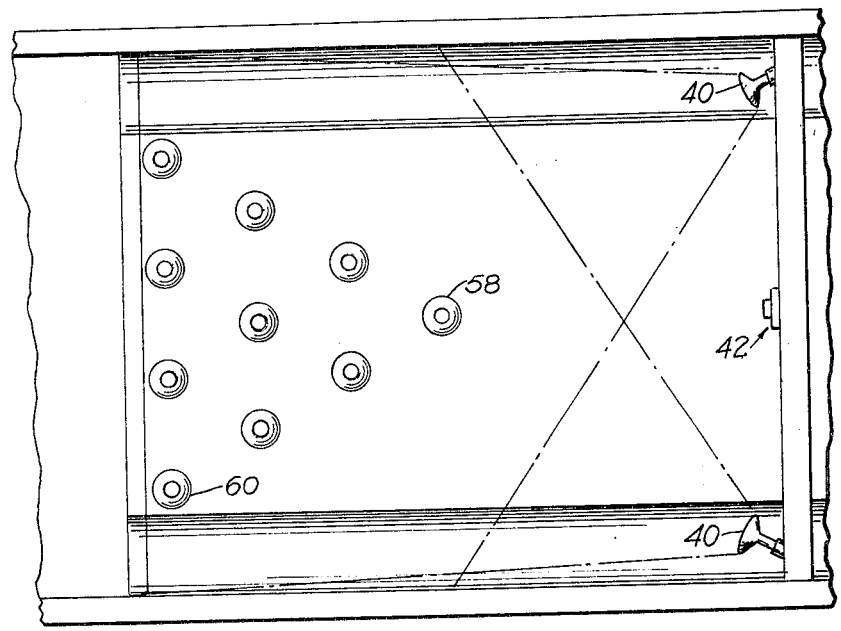
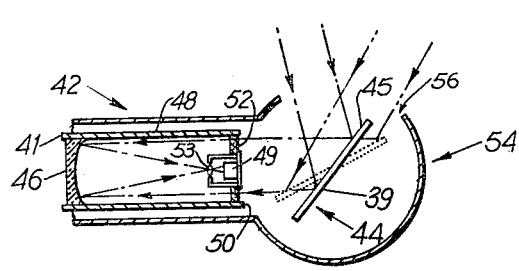
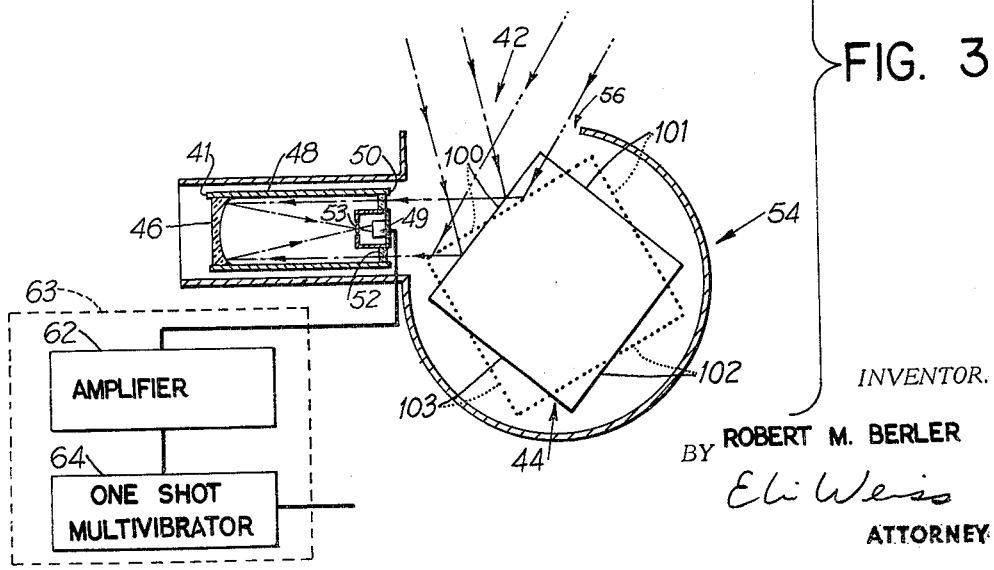
FIG. 3
INVENTOR.
ROBERT M. BERLER
BY Eli Weiss
ATTORNEY

United States Patent Office 3,501,644
Patented Mar. 17, 1970

3,501,644
RADIATION SENSITIVE BOWLING PIN SENSOR
Robert M. Berler, Westport, Conn., assignor to American Machine & Foundry Company, a corporation of New Jersey
Filed May 31, 1967, Ser. No. 642,500
Int. Cl. G06m 7/04; H01j 39/12
U.S. Cl. 250—222                              11 Claims

ABSTRACT OF THE DISCLOSURE

Apparatus for determining the pressure or absence of standing bowling pins on a bowling alley which comprises reflecting means oriented to receive radiant energy reflected from a bowling pin standing on the alley, drive means coupled to rotatably drive said reflecting means to scan a bowling alley for standing pins, light sensitive means, light collecting means oriented to focus the radiant energy received from said reflecting means to said light sensitive means, and circuit means connected to said light sensitive means and operable to be activated by the reception of radiant energy at the light sensitive means by a standing pin.

---

This invention relates generally to bowling pin spotting machines and more particularly to means for providing information as to the presence and absence of pins standing on the pin deck.

A number of systems have heretofore been proposed for providing information, usually in the form of electrical signals, as to the pins standing on the pin deck of a bowling alley. Some such systems have employed sensing switches associated with the pinhandling devices of the spotting table of an automatic pin spotter. Other systems have been proposed which require sensing devices each embedded in the pin deck at one of the pin spots. Still other systems proposed in the past have depended upon photoelectric devices for detecting the presence or absence of standing pins.

While photoelectric systems for providing information about standing pins have some distinct advantages, including speed of operation, freedom from dependence on mechanical devices, and avoidance of devices embedded in the pin deck, attempts to provide successful photoelectric pin sensing systems have met with considerable difficulty because of the fact that the entire area of the pin deck must be well illuminated with visible light for the benefit of the players, the visible illumination falling as well on fallen pins as on standing pins, so that ordinary photoelectric systems fail to distinguish adequately bteween standing and fallen pins.

It is accordingly an object of this invention to provide an improved photoelectric system capable of responding only to standing pins even though the entire pin deck, and all of the fallen pins thereon are subjected to visible light.

It is another object of this invention to provide an improved photoelectric system which is reliable in operation and economical to produce.

It is still another object of this invention to provide an improved photoelectric system which can be used to indicate the occurrence of a strike condition.

It is also an object of this invention to provide an improved photoelectric system which can be used to indicate the occurrence of a spare condition.

Other objects and many of the attendant advantages of this invention will be readily appreciated as the apparatus becomes better understood by reference to the following detailed description when considered in connection with the accompanying drawings wherein:

FIG. 2 is a diagrammatic plan view of the bowling alley installation of FIG. 1;

FIG. 3 is a vertical sectional view of the photoelectric transducer assemblage employed in the bowling alley installation of FIG. 1.

Figure 1:
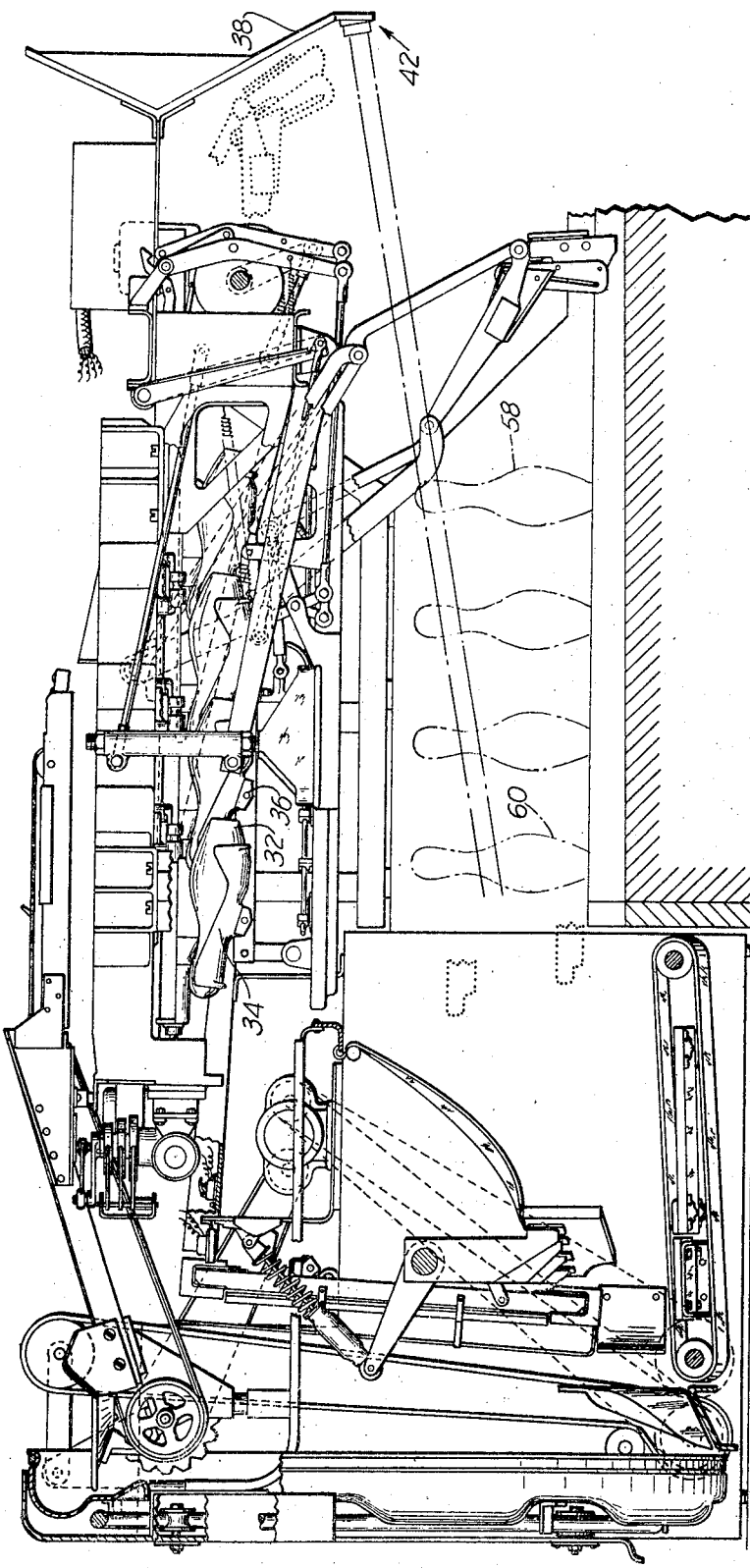
FIG. 1 is a partial side elevated view of a bowling alley installation constructed in accordance with an embodiment of the invention.

Referring now to the drawings, FIG. 1 shows a bowling pin spotting machine of the type shown in Congelli et al. U.S. Patent No. 3,245,684. The machine comprises a table 20 which supports ten pinspotting units 22 operative to spot pins; and, ten re-spotting units 24 which grip, lift and re-spot pins onto the playing deck 26 of a bowling alley or lane.

Each re-spotting unit 24 has associated therewith a normally open switch corresponding to switches 299 as shown in FIGS. 15 and 16 of Congelli et al. U.S. Patent No. 3,245,684 and switches GS1–10 as shown in Blewitt U.S. Patent No. 3,231,272 for indicating the presence or absence of a pin.

Pinspotting units 22 which are arranged in a triangular array, and table 20, can be of the same construction and operate in the same manner as the table and pinspotting mechanism shown and described in Congelli et al. U.S. Patent No. 3,245,684. In the description of this invention, the detailed construction of table 20 and the mechanism for raising and lowering it to and from the pin supporting deck of a bowling alley are not required to impart an understanding of the invention and, therefore, are not described herein.

In the normal operation of a pinspotting machine, after the first ball of a frame is rolled, table 20 is lowered to permit the re-spotting units 24 to grip and hold pins which are to be respotted in on-spot or off-spot positions on the playing deck of the alley. Pins gripped and held in re-spotters 24 are raised above the alley pin deck 26 as table 20 moves upward, and while held in the elevated position, a sweep 28 is operated to clear the alley of fallen pins. As soon as sweep 28 has been returned to its inoperative position, the table 20 is again lowered to effect the release of re-spotted pins from their respective re-spotting unit 24. This operation being completed, table 20 against moves upwardly to its inactive, or dwell, position awaiting the rolling of the next ball and completion of the frame. After the second ball of the frame is rolled, the sweep removes standing and fallen pins from the alley and returns to its dwell position, whereupon table 20 moves downwardly, the spotting units 22 spot a new set of pins on the pin deck of the alley and table 20 again returns to its inactive position above the alley so that the first ball of the first frame can then be rolled. Thus, in normal two ball cycle, after the first ball is rolled, the table makes two trips to and from the alley—the first to pick up the pins still standing, to permit the occurrence of a sweep of all fallen pins from the alley; and the second to re-spot the pins initially left standing. Upon the rolling of the second ball, the pins—those standing and fallen—are cleared from the alley by a sweep and ten pins are spotted on the alley. One trip of the table to and from the alley is required.

If a strike occurs, i.e. when all pins are knocked down by the first ball of a frame, the following happens: The initial operations are the same as for the first ball, but as there will be no pins standing, when table 20 is moved downwardly none of the re-spotting units will engage a pin. This trip to and from the alley by the table is necessary as the presence and absence of standing pins is detected by the re-spotting units 24 in the table. This non-engagement of the re-spotting units with any pins will be sensed by the machine. The table then ascends and the sweep cycle is begun. When the sweep cycle is completed, the table descends, spots ten pins and returns to its up position. Thus, when a strike cycle occurs, mechanical and electrical intelligence notifies the machine to spot a new set of pins and re-set to indicate that the next occurring ball will be the first ball of a frame. However, two trips of the table to and from the alley are required.

In accordance with the present invention, means are provided to expedite the operation of the machine when a strike occurs by eliminating the requirement that the table make a trip to and from the alley to sense for the absence of standing pins.

Continuing with FIG. 1, a horizontal frame 32 supports ten spotting cups 34. The spotting cups are arranged in the usual triangular manner and each cup is mounted to swing about the horizontal axis of one of the shafts 36. Vertical movement of frame 32 upwardly and downwardly is accomplished by the drive means which also causes oscillation of shafts 36 in such fashion that, as the frame descends, the cups swing downwardly to pin depositing position but, during upward travel of the frame, are always swung back to their initial positions as shown in FIG. 1.

Positioned between the bowler and the pin spotter is a frontal mask unit 38, the lower edge of which is spaced above the alley bed by about the same distance as the pin cups 34 when the cups are in their raised positions. Two sources of radiant energy 40, such as flood lights or the like, are supported by a support behind the frontal mask 38 and oriented to direct their light towards the pins on the alley. The lamps are mounted at opposite sides of the alley to eliminate the possibility of a pin being within the shadow of another pin.

The two flood lights provide general illumination to the front portion of each pin which supplements, to some extent, the general lighting of the pins.

Positioned between the lights 40 on the back of the frontal mask unit 38 and oriented to view each of the pins one through ten when in their standing positions is a sensing means 42.

Referring to FIG. 3, the sensing means 42 comprises a flat plane reflecting means 44 such as a mirror or the like having single or double reflecting surfaces 45, 39. The reflecting means 44 is rigidly coupled to a shaft which is rotatably supported by one or more bearings. The shaft is driven either directly or through appropriate gears, pulley or the like at a relatively constant speed by a motor. If desired, the reflecting means 44 can have one or more reflecting surfaces. For example, a support member such as a light weight frame support member of metal, plastic or the like coupled rigidly to the rotatably supported shaft and having one, two, three, four or more surfaces for supporting reflecting surfaces.

A light collecting means such as a spherical or parabolic reflecting surface 46 having its front surface aluminized and overcoated for protection is mounted within one end 47 of an opaque tube 48, the interior of which is treated with a dull surfaced black finish or the like, to reduce reflections is positioned to receive light reflected from the plane reflecting surface. A light sensitive means such as cadmium selenide photocell 49 is positioned at the other end 50 of the tube and retained in position by two or three thin support spokes 52; or by a transparent member positioned within the end 50 of the tube 48 and having a cutout within which the photocell is positioned. The transparent member has an advantage over the spokes in that it functions as a dust seal to keep the interior of the tube relatively clean. The cell 49 is oriented to face the reflecting surface 46 and positioned from the reflecting surface 46 a distance slightly greater than the focal length of the reflecting surface.

A small field lens 53 positioned immediately in front of the photocell is located at the focal point of the spherical or parabolic reflecting surface 46. The field lens helps keep the photocell more evenly illuminated when limited off axis light is directed towards the reflecting surface 46.

The tube 48 in combination with the reflecting surface 46 functions in a manner similar to that of a reflecting type of telescope. It is to be understood that this invention is not restricted to this specific structure, and that of a refracting type of telescope. Where a refracting type of telescope is used, light collecting means such as a lens system is positioned within the end 50 of tube 48; and the photocell 49 is positioned at the other end 41 of tube 48. A small field lens 53 similar to that described above for the reflecting type of telescope 49 is positioned at the focal point of the lens system; and the photocell 49 is positioned immediately behind the field lens.

A light baffle 54 having a cutout 56 is positioned around the plane reflecting surface 44 and tube assemblage. The sensing means 42 is secured to the back of the frontal mask unit, the opening 56 being oriented to permit the mirrors, when rotating, to view each of the ten pins standing.

In practice, satisfactory results were obtained with the sensing means 42 positioned approximately twenty inches above the alley deck and constructed to have a substantially non-diverging cylindrical field of view approximately one and one-half inches in diameter. To obtain the one and one-half inch diameter field, the flat plane reflecting means 44 is in the form of a circle approximately two inches in diameter; and the inside diameter of the tube 48 is approximately one and one-half inches. The spherical or parabolic reflecting surface 46 has a diameter slightly less than the internal diameter of the tube 48 to permit the reflecting surface 46 to be positioned securely within the tube 48.

The opening or cutout 56 in the light baffle is rectangular in shape and having a width of approximately two and one-half inches and a length sufficient to permit the cylindrical field of view to have a scan which extends across the array of the ten standing pins.

A bowling pin is approximately fifteen inches in height. Therefore, when the sensing means 42 is positioned approximately twenty inches above the alley, the cylindrical field of view of the sensing means will intercept the top portion of the closest or number one position pin 58; and it will intercept the lower neck portion of the furthest or number seven or ten position pin 60.

A cadmium selenide photocell is sensitive to light in the yellow-orange-red portion of the spectrum. To present the bowling pins to the photocell 49 under the most ideal conditions practically attainable, the flood lights operated in a manner designed to generate light in the yellow-orange-red portion of the spectrum. This is accomplished by coupling in series two standard one hundred fifteen volt-one hundred fifty watt flood lights of the type manufactured by General Electric or Westinghouse. When in series, each flood light operates at approximately one-half rated potential to produce light energy rich in the yellow-orange-red portion of the spectrum.

A standard bowling alley is approximately five feet in width. The flood lights 40, 41 being positioned at the ends of the frontal mask unit 38 are approximately spaced five feet apart.

In operation, the flood lights are operated at one-half rated potential to direct a generous intensity of light in the yellow-orange-red portion of the spectrum to the front portion of the standing bowling pin. The motor coupled to the reflecting means 44 is energized to drive the plane surface reflecting means around at a relatively constant speed. As the reflecting means 44 is rotated, it will intercept the light reflected from the standing pins on the alley and transmit it into the tube 48 to the spherical or parabolic reflecting surface 46 which redirects the lights to the photo cell 49.

In practice, the rotating reflecting means 44 had four reflecting surfaces 100, 101, 102 and 103 and when driven at thirty revolutions per minute was found to provide good results. It is to be understood, however, that other rotational speed and/or number of reflecting surfaces on the reflecting means will also provide satisfactory results.

The signal from the photo cell is fed to a signal means 63 which presents at its output terminal a first signal condition of a pin is sensed and a second signal condition of a pin is not sensed. An amplifier 62 and a one-shot multivibrator 64 is one of a number of methods of indicating the activation or non-activation of the photocell. When a multivibrator is used, it should have a time constant which is slightly longer than that interval of time required for the rotating reflecting means to complete a single scan of the alley. When using four reflecting surfaces driven at thirty r.p.m., a time constant of approximately 700 milliseconds provides good results. With this arrangement, one alley scan for each 90° rotation of the motor output shaft or four scans per two seconds was obtained.

In operation, if one or more pins is standing, the light reflected from the standing pin or pins will be sensed by the rotating reflecting means 44 and directed from the reflecting surface to the photocell to generate a pulse shaped signal. The pulse shaped signal is fed through the signal means which, having a time constant greater than the time required to scan for the presence of pins on the alley, remains in its active state (or inactive state if desired). If no pins are standing on the alley, no light will be directed to the photocell through the reflecting means 44 and light collecting means 46. A pulse signal will not be generated by the photocell, and the signal means will remain in its inactive state.

The invention above described detects and indicates the presence and absence of standing pins on an alley. The utilization of this invention, in combination with the bowling pin spotting machine of the type shown in Congelli et al. U.S. Patent No. 3,245,684 will eliminate the need of the table to descend twice to make two trips to and from the alley when a strike occurs. Only one trip will be required, that being to spot a new set of pins; the first trip, that of sensings for standing pins would be eliminated.

Similarly, if the table is used to detect the presence or absence of pins for scoring purposes, then this invention can also be used to indicate the occurrence of a spare (all pins knocked down with two balls) and, the requirement that the table make one trip to and from the alley to detect the occurrence of a spare can be eliminated.

Obviously, many modifications and variations of the present invention are possible in the light of the above teachings. It is, therefore, to be understood that within the scope of the appended claims the invention may be practiced otherwise than as specifically described.

What is claimed is:

1. Apparatus for determining the presence or absence of standing bowling pins on a bowling alley, which comprises reflecting means oriented to receive radiant energy reflected from a bowling pin standing on the alley, drive means coupled to rotatably drive said reflecting means to scan a bowling alley for standing pins, light sensitive means, light collecting means oriented to focus the radiant energy received from said reflecting means to said light sensitive means, and circuit means connected to said light sensitive means and operable to be activated by the reception of radiant energy at the light sensitive means by a standing pin.

2. The combination of claim 1 wherein said reflecting means comprises at least one plane surfaced mirror.

3. The combination of claim 2 wherein said light collecting means comprises a spherical shaped mirror.

4. The combination of claim 2 wherein said light collecting means comprises a parabolic shaped mirror.

5. The combination of claim 3 wherein said light sensitive means comprises a cadmium selenide cell.

6. The combination of claim 1 wherein said circuit means is coupled to a bowling pin spotting machine drive and is operable to change the operation thereof upon the detection of no standing pins.

7. The combination of claim 6 wherein said circuit means comprises a one-shot multivibrator having a time constant greater than the interval of time required for the reflecting means to complete a scan of the bowling alley for standing pins and an amplifier interposed between said light sensitive means and said one-shot multivibrator.

8. The combination of claim 6 including a source of light operated at less than rated value and oriented to illuminate pins standing on the alley.

9. The combination of claim 1 including a light baffle positioned to block the passage of undesired light to said light sensitive means.

10. The combination of claim 1 wherein said reflecting means comprises four plane surfaced mirror.

11. The combination of claim 1 wherein said light sensitive means is optically isolated from receiving radiant energy directly from said reflecting means.

References Cited

UNITED STATES PATENTS

| | | | |
|---|---|---|---|
| 2,521,946 | 9/1950 | Rathje | 250—222 X |
| 3,005,916 | 10/1961 | Lentze | 250—219 |
| 3,072,798 | 1/1963 | Sick | 250—236 X |
| 3,140,872 | 7/1964 | Bolger | 273—54 |
| 3,184,847 | 5/1965 | Rosen | 250—235 X |
| 3,309,086 | 3/1967 | Viets et al. | 273—54 |
| 3,333,184 | 7/1967 | Adelman et al. | 250—226 X |

WALTER STOLWEIN, Primary Examiner

U.S. Cl. X.R.

250—236; 273—46